(12) United States Patent
Iwama et al.

(10) Patent No.: US 12,546,918 B2
(45) Date of Patent: Feb. 10, 2026

(54) DIFFUSED LIGHT CONTROL SHEET AND DIFFUSED LIGHT IRRADIATION DEVICE

(71) Applicant: Shin-Etsu Polymer Co., Ltd., Tokyo (JP)

(72) Inventors: Susumu Iwama, Shiojiri (JP); Naoya Takizawa, Shiojiri (JP)

(73) Assignee: SHIN-ETSU POLYMER CO., LTD., Tokyo (JP)

( * ) Notice: Subject to any disclaimer, the term of this patent is extended or adjusted under 35 U.S.C. 154(b) by 394 days.

(21) Appl. No.: 18/043,567

(22) PCT Filed: Aug. 31, 2021

(86) PCT No.: PCT/JP2021/031946
§ 371 (c)(1),
(2) Date: Feb. 28, 2023

(87) PCT Pub. No.: WO2022/050275
PCT Pub. Date: Mar. 10, 2022

(65) Prior Publication Data
US 2023/0266511 A1 Aug. 24, 2023

(30) Foreign Application Priority Data
Sep. 1, 2020 (JP) ................ 2020-146670

(51) Int. Cl.
*G02B 5/02* (2006.01)
*F21V 3/06* (2018.01)
*G02B 1/04* (2006.01)

(52) U.S. Cl.
CPC ......... *G02B 5/0278* (2013.01); *F21V 3/0625* (2018.02); *G02B 1/04* (2013.01); *G02B 2207/123* (2013.01)

(58) Field of Classification Search
CPC .......... G02B 5/02–0278; G02B 5/0294; G02B 1/04; G02B 2207/123; G02B 26/08;
(Continued)

(56) References Cited

U.S. PATENT DOCUMENTS

| | | | |
|---|---|---|---|
| 2007/0172686 A1* | 7/2007 | Lee | G02B 5/305 428/523 |
| 2008/0144179 A1* | 6/2008 | Mimura | G02B 5/0252 359/599 |

(Continued)

FOREIGN PATENT DOCUMENTS

| | | | |
|---|---|---|---|
| JP | 2001305312 A | 10/2001 | |
| JP | 2008107404 A | 5/2008 | |

(Continued)

OTHER PUBLICATIONS

International Search Report in PCT Application No. PCT/JP2021/031946 mailed Nov. 16, 2021, 5pp.

*Primary Examiner* — Stephone B Allen
*Assistant Examiner* — Adam W Booher
(74) *Attorney, Agent, or Firm* — HAUPTMAN HAM, LLP

(57) ABSTRACT

A diffused light control sheet includes: a louver layer on which light-transmitting zones and light-shielding zones are arranged alternately; a transparent protective layer disposed on a first face of the louver layer; and a light-diffusing layer disposed on a second face of the louver layer, in which the light-diffusing layer has a haze of 93% or more as measured in accordance with JIS K 7136 (2000).

4 Claims, 3 Drawing Sheets

(58) Field of Classification Search
CPC ......... G02B 5/00; F21V 3/0625; B32B 7/023; B32B 25/08; B32B 25/20; B32B 25/36
See application file for complete search history.

(56) References Cited

U.S. PATENT DOCUMENTS

| | | | |
|---|---|---|---|
| 2012/0008070 A1* | 1/2012 | Takemoto | G02B 3/005 349/96 |
| 2012/0327341 A1* | 12/2012 | Honda | G02F 1/133308 349/122 |
| 2019/0285937 A1* | 9/2019 | Fuchida | G02B 5/02 |
| 2020/0238684 A1* | 7/2020 | Usami | B41F 17/00 |

FOREIGN PATENT DOCUMENTS

| | | |
|---|---|---|
| JP | 2012137722 A | 7/2012 |
| JP | 2017150209 A | 8/2017 |
| JP | 2019191259 A | 10/2019 |

* cited by examiner

DIFFUSED LIGHT CONTROL SHEET AND DIFFUSED LIGHT IRRADIATION DEVICE

FIELD

The present invention relates to a diffused light control sheet and a diffused light irradiation device capable of converting incident light into diffused light and controlling the irradiation direction of the diffused light. The present application is a National Phase of International Application Number PCT/JP2021/031946, filed Aug. 31, 2021, which claims priority based on Japanese Patent Application No. 2020-146670 filed in Japan on Sep. 1, 2020, the contents of which are hereby incorporated herein by reference.

BACKGROUND

Conventionally, a viewing angle control sheet provided with a louver layer, on which light-transmitting zones and light-shielding zones are arranged alternately, and transparent resin layers affixed to both sides of the louver layer has been disclosed (Patent Literature 1). In this viewing angle control sheet, the transparent resin layer has a multilayer structure and has an excellent balance between surface hardness and internal toughness, making it difficult to whiten or deform.

CITATION LIST

Patent Literature

Patent Literature 1: Japanese Patent Application Laid-open No. 2019-191259

SUMMARY

Technical Problem

In recent years, LEDs with low power consumption, excellent durability, and high luminance have been increasingly adopted as light sources. Since the light emitted from an LED has a high rectilinear propagation property, an area on which the light flux is incident is brightly illuminated, while an area outside the light flux is not sufficiently illuminated. For this reason, some measures have been taken such that a light diffuser is attached in front of an LED light source to reduce the rectilinear propagation property of light and illuminate a wide area. However, since the light contained in diffused light travels in various directions, it may illuminate unwanted areas. For example, if a light diffuser is fitted into an opening of a small window (through-hole) included in an indicator in an instrumental panel of a car, and an LED light source is placed directly below the light diffuser, diffused light is emitted from the indicator to all directions inside the car. In this case, there is a concern that the light from the indicator will reflect on a windshield of the car, obstructing the field of vision of a driver. In addition, the indicator light, which needs to be visually recognized by only the driver, may also be visually recognized by a passenger on a front seat or a rear seat. Therefore, there is a need to control the direction of light emitted from a light diffuser.

The present invention provides a diffused light control sheet and a diffused light irradiation device capable of converting light having a high rectilinear propagation property into diffused light and controlling the irradiation direction of the diffused light.

Solution to Problem

[1] A diffused light control sheet including: a louver layer on which light-transmitting zones and light-shielding zones are arranged alternately; a transparent protective layer disposed on a first face of the louver layer; and a light-diffusing layer disposed on a second face of the louver layer, in which the light-diffusing layer has a haze of 93% or more as measured in accordance with JIS K 7136 (2000).

[2] The diffused light control sheet as described in [1], in which at least the light-transmitting zones or the light-shielding zones are formed of silicone rubber.

[3] The diffused light control sheet as described in [1] or [2], in which the light-diffusing layer is a resin film bonded to the second face of the louver layer, and at least one surface of the resin film is roughened.

[4] The diffused light control sheet as described in any one of [1] to [3], in which the light-diffusing layer is a resin film bonded to the second face of the louver layer, and the resin film contains a light-diffusing material.

[5] The diffused light control sheet as described in [3] or [4], in which each of the transparent protective layer and the resin film is independently a polycarbonate film.

[6] The diffused light control sheet as described in [1], in which the light-diffusing layer has a multilayer structure formed by two or more resin layers.

[7] The diffused light control sheet as described in [1], in which a base layer is disposed on the second face of the louver layer with an adhesive layer interposed therebetween, the light-diffusing layer is the adhesive layer, and the adhesive layer contains a light-diffusing material.

[8] The diffused light control sheet as described in any one of [1] to [7], in which the transparent protective layer has a multilayer structure formed by two or more resin layers, a first resin layer in the multilayer structure that defines a front surface opposite to the louver layer is formed of a (meth) acrylic resin, and a second resin layer in the multilayer structure that defines a back surface on the louver layer side is formed of a polycarbonate.

[9] A diffused light irradiation device, including the diffused light control sheet as described in any one of [1] to [8], and a light source installed on the second face side of the louver layer of the diffused light control sheet.

Advantageous Effects of Invention

A diffused light control sheet according to the present invention includes a light-diffusing layer and a louver layer. When a light source such as an LED is installed on the light-diffusing layer side, the rectilinear light from the light source is incident on the light-diffusing layer to be diffused in the light-diffusing layer, and then the diffused light is emitted from the light-diffusing layer in a plane shape. The diffused light emitted from the light-diffusing layer enters the louver layer, and diffused light aligned in a specific direction, i.e., in the thickness direction of the light-transmitting zone of the louver layer, is emitted from the louver layer. Therefore, for example, if the diffused light control sheet of the present invention is installed so as to cover, from the inside, an opening of a small window (through hole) provided to an enclosure and an LED light source is installed directly under the diffused light control sheet, light from the LED light source is transmitted through the diffused light control sheet and is emitted outward from the small window of the enclosure in a specific direction only. As a result, the entire small window can be brightly illuminated when viewed from a particular direction, but the light in the small window can be unobserved when viewed from other directions.

The diffused light irradiation device includes the diffused light control sheet, and can therefore convert the incident light having a high rectilinear propagation property into diffused light and emit the diffused light in a specific direction by narrowing the viewing angle (emission angle).

DESCRIPTION OF EMBODIMENTS

<<Diffused Light Control Sheet>>

A first mode of the present invention is a diffused light control sheet including: a louver layer on which light-transmitting zones and light-shielding zones are arranged alternately; a transparent protective layer disposed on a first face of the louver layer; and a light-diffusing layer disposed on a second face of the louver layer, wherein the light-diffusing layer has a haze of 93% or more as measured in accordance with JIS K 7136 (2000) (corresponding international standard: ISO 14782 (1999)).

The following is a specific explanation with reference to the drawings, but the dimensions in the figures differ from the actual for the sake of convenience of explanation. In this specification, the numerical value range of "lower limit to upper limit" means the numerical value range of "the lower limit or more and the upper limit or less" unless otherwise specified. In this specification, "thickness" is the value obtained by observing the cross section of an object to be measured using a digital microscope or other magnifying means, measuring the thickness at five arbitrary locations, and averaging the measurements.

<Diffused Light Control Sheet 10>

Figure 1:
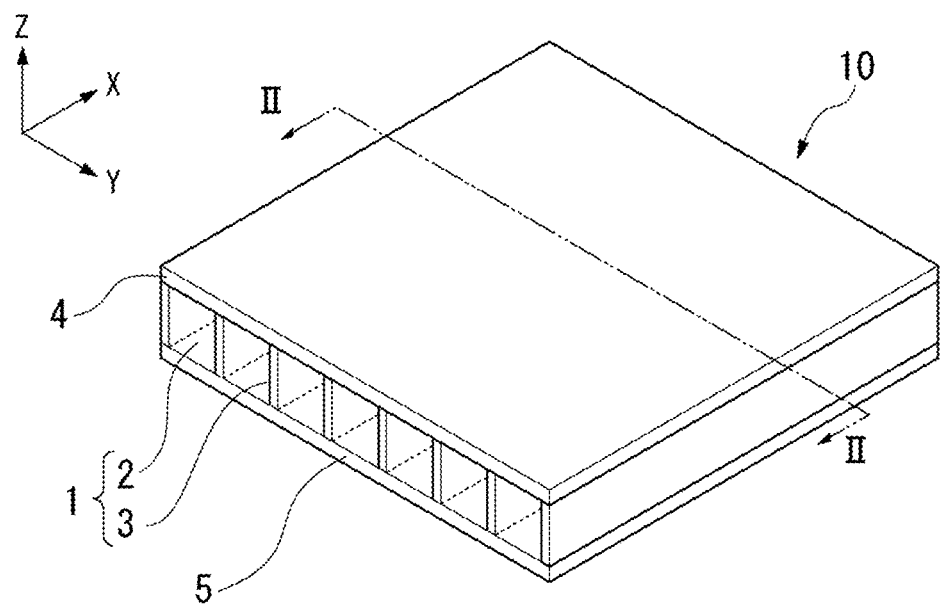
FIG. 1 is a perspective view illustrating an example of a diffused light control sheet according to the present invention.
Figure 2:
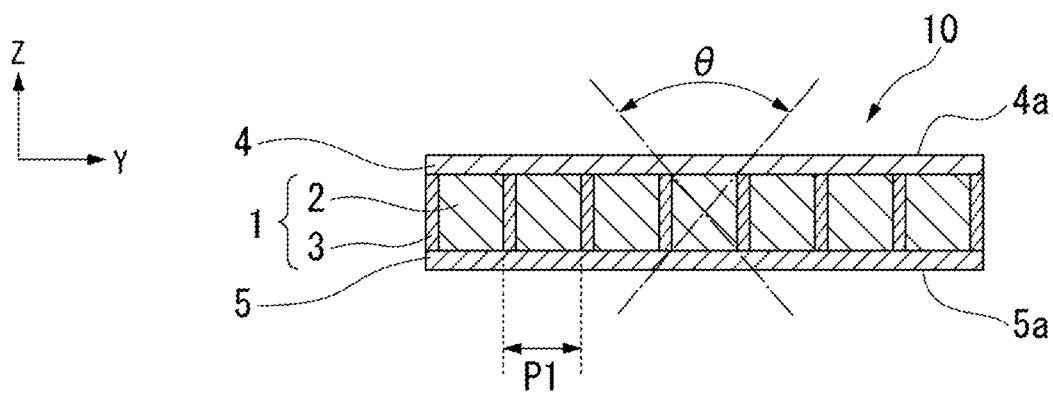
FIG. 2 is a cross-sectional view along line II-II in FIG. 1.

As illustrated in FIGS. 1 and 2, a diffused light control sheet 10 of a first embodiment includes: a louver layer 1 on which light-transmitting zones 2 and light-shielding zones 3 are arranged alternately; a transparent protective layer 4 disposed on a first face of the louver layer 1; and a light-diffusing layer 5 disposed on a second face of the louver layer 1. The first face and the second face of the louver layer 1 are principal surfaces opposite each other.

The size of the diffused light control sheet 10 may be, but not particularly limited to, for example, a size of a rectangle of approximately 1 mm to 100 cm in length and 1 mm to 100 cm in width. The thickness of the diffused light control sheet 10 with the transparent protective layer 4, the louver layer 1, and the light-diffusing layer 5, can be, for example, approximately 500 µm to 1 cm.

[Louver layer 1] The thickness direction of the diffused light control sheet 10 is a Z direction, the direction in the plane perpendicular to the Z direction in which the light-transmitting zones 2 and the light-shielding zones 3 extend is an X direction, and the direction perpendicular to both the X direction and the Z direction is a Y direction. Each light-transmitting zone 2 and light-shielding zone 3 included in the louver layer 1 is a strip extending in the X direction. The plurality of light-transmitting zones 2 and the plurality of light-shielding zones 3 are arranged alternately in the Y direction. The light-transmitting zones 2 have widths that are uniform in the Y direction and constant in the X direction. The light-shielding zones 3 have widths that are uniform in the Y direction and constant in the X direction.

The light-transmitting zones 2 and the light-shielding zones 3 of the louver layer 1 are strip portions penetrating in the thickness direction (Z direction) of the louver layer 1. Light is transmitted, through the light-transmitting zones 2, along the thickness direction of the louver layer 1, i.e., the thickness direction of the diffused light control sheet 10. The range of viewing angles (visible angle) through which light can be transmitted is represented by θ in FIG. 2.

[Width of light-transmitting zone and light-shielding zone] The widths of the light-transmitting zone 2 and light-shielding zone 3 (thickness in the horizontal direction in FIG. 2) are freely set. The pitch of the light-shielding zones 3 (louver pitch) is the repetition period of the widths of the light-transmitting zone 2 and the light-shielding zone 3. The louver pitch is the sum of the width of one light-transmitting zone 2 and the width of one light-shielding zone 3 adjacent to that light-transmitting zone 2 when viewed from the Y direction in FIG. 2. Reference sign P1 in FIGS. 2 to 5 represents the louver pitch. From the viewpoint of avoiding uneven luminance in transmitted light when viewed in plan view, the louver pitch is preferably constant.

The light transmittance of the louver layer 1 can be adjusted by the ratio between the width of the light-transmitting zone 2 and the width of the light-shielding zone 3. The range of viewing angle θ can be adjusted by the width of the light-transmitting zone 2 and the thickness of the louver layer 1.

In consideration of satisfying both diffused light control and light transmittance, the width of the light-transmitting zone 2 is preferably 40 µm to 200 µm, and more preferably 100 µm to 150 µm. The width of the light-shielding zone 3 is preferably 1 µm to 50 µm, and more preferably 10 µm to 30 µm. When the respective widths are adjusted in the above ranges, for example, a diffused light control sheet 10 having a viewing angle θ of 30° to 120° and a light transmittance of 65% or more can be obtained.

The ratio of the width of the light-shielding zone 3 to the width of the light-transmitting zone 2 is preferably 0.005 to 1, and more preferably 0.06 to 0.35.

The thickness of the louver layer 1 is preferably 100 µm to 5000 µm, more preferably 150 µm to 1000 µm, and further preferably 200 µm to 500 µm. When the thickness of the louver layer 1 is in the above range, the viewing angle θ can be easily controlled.

(Material of Louver Layer 1)

At least the light-transmitting zones 2 or the light-shielding zones 3 are preferably made of silicone rubber. Silicone rubber has superior heat resistance, chemical resistance, degradation resistance, transparency, and flexibility, and is therefore extremely excellent as an optical material.

From the viewpoint of improving the adhesiveness of the light-shielding zones 3 to the light-transmitting zones 2, the light-shielding zones 3 is preferably made of silicone rubber like the light-transmitting zones 2.

(Material of Light-Transmitting Zone 2)

The material composing the light-transmitting zones 2 included in the louver layer 1 is preferably a resin with high transparency. Specifically, when light is emitted only to the light-transmitting zone 2 of the louver layer 1 in the thickness direction of the louver layer 1, the material preferably has a light transmittance (light ray transmittance) of 75% or more, and more preferably 85% or more. Here, the upper limit of light transmittance can be, but not particularly limited to, for example, 99.99% or lower. As the resin, for example, a thermoplastic resin or a thermosetting resin with high transparency is used, and specific examples may include, for example, cellulosic resins, polyolefin resins, polyester resins, silicone resins, polystyrene resins, polyvinyl chloride resins, acrylic resins, and polycarbonate resins. Silicone resin is preferable among these, and silicone rubber is especially preferable in terms of heat resistance, chemical resistance, degradation resistance, transparency, and flexibility. Silicone rubber may be a composition containing components other than silicone resin.

Silicone rubbers may be: for example, silicone rubber compositions, commonly called "millable rubbers", comprising a diorganopolysiloxane having ends of the molecular chain blocked with hydroxysilyl groups or vinylsilyl groups and an organic peroxide; and organosilicone rubber of what is called addition reaction type obtained by mixing diorganopolysiloxane having at least two vinyl groups each bonded to a silicon atom in the molecule with organohydrogen polysiloxane having at least three hydrogen atoms each bonded to a silicon atom (=SiH bond) in the molecule and a platinum-based catalyst.

(Material of Light-Shielding Zone 3)

The material composing the light-shielding zones 3 included in the louver layer 1 is preferably, but not particularly limited to, for example, a colored resin obtained by adding a coloring agent such as pigment or dye to a base using the resin above listed as the material of the light-transmitting zones 2. Although the resin material of the light-transmitting zone 2 and the resin material as the base material of the light-shielding zone 3 may be the same or different, it is preferable that the resin materials for both the light-transmitting zone 2 and the light-shielding zone 3 be the same because the adhesive property between the light-transmitting zone 2 and the light-shielding zone 3 tends to be good.

The color tone of the light-shielding zone 3 only needs to provide sufficient light-shielding property and may be, for example, black, red, yellow, green, blue, and light blue. The color tone and the light-shielding property of the light-shielding zone 3 can be adjusted by the type and amount of a coloring agent added. Specifically, when light is emitted only to the light-shielding zone 3 of the louver layer 1 in the thickness direction of the louver layer 1, the material preferably has a light-shielding property such that light transmittance is 20% or less, and preferably 5% or less. Light transmittance may be 0%. The color tone of the light-shielding zone determines the color tone of the louver layer 1 when being looked at, and therefore it is preferred to consider decorative qualities in the design work.

Examples of a coloring agent include common organic or inorganic pigments such as carbon black, iron oxide, titanium oxide, yellow iron oxide, disazo yellow, phthalocyanine blue, and the like. One or more coloring agents may be used. If black pigment is not used, white pigment is preferably used in combination to obtain good light-shielding property.

[Transparent protective layer 4] The transparent protective layer 4 on the first surface of the louver layer 1 is a resin layer. The surface of the transparent protective layer 4 may be treated with antireflection treatment, anti-glare treatment, hard coat treatment, or the like publicly known in the field of resin molded products.

At least part of the transparent protective layer 4 may be transparent (light transmissive), and other parts, having printing or decoration, may be opaque.

Examples of a material composing the transparent protective layer 4 may include publicly known transparent resins, such as (meth)acrylic resins, polycarbonate resins, polyester resins, polyolefin resins, and polystyrene resins. Here, (meth)acrylic means acrylic or methacrylic. Among these resins, (meth)acrylic resins and polycarbonate resins have superior hardness and transparency and are therefore preferable. Since (meth)acrylic resins have excellent light resistance and scratch resistance, and polycarbonate resins have excellent impact resistance, rigidity, and toughness, the transparent protective layer 4 may have a multilayer structure including laminated layers of (meth)acrylic resin and polycarbonate resin.

When the diffused light control sheet 10 is installed near a light source that emits heat, the transparent protective layer 4 preferably has heat resistance, and from this viewpoint, the transparent protective layer 4 is preferably formed of a polycarbonate resin.

The thickness of the transparent protective layer 4 can be, but not particularly limited to, for example, approximately 30 μm to 3000 μm. If the transparent protective layer 4 has a multilayer structure of two or more layers, the total thickness can be adjusted to the above range. When the transparent protective layer 4 is a laminate of a first resin layer and a second resin layer, the thickness of the first resin layer is set to, for example, 1 μm to 200 μm, and the thickness of the second resin layer can be set to, for example, 800 μm to 1200 μm.

If the first resin layer is thinner than the second resin layer, the first resin layer may be a hard coat layer being a cured coating of resin composition or may be a resin film. The resin film may be a PET film.

[Light-diffusing layer 5] The light-diffusing layer 5 on the second surface of the louver layer 1 may be a layer in which incident light is diffused and diffused light is emitted from the main surface of the light-diffusing layer 5. In general, LED light sources are not considered two-dimensional light sources and are called point light sources or line light sources, whereas the light-diffusing layer 5 is called a surface light source because the light emitting area is two-dimensionally spread.

A haze of the light-diffusing layer 5 of the present embodiment that is measured with a haze meter in accordance with JIS K 7136 (2000) is 93% or more, preferably 94% or more, more preferably 95% or more, and yet more preferably 96% or more. Here, the preferable light transmittance of the light-diffusing layer 5 is, for example, 10 to 90%.

When the haze is equal to or more than the lower limit of the above range, light having a high rectilinear propagation property such as LED light can be sufficiently diffused and the light-diffusing layer 5 can function as a surface light source.

The upper limit of haze may be, but not particularly limited to, 100%.

Examples of the light-diffusing layer 5 in the present embodiment may include, for example, (a) a resin film having at least one major surface roughened, (b) a resin film containing a light diffusion material, (c) a resin film having at least one major surface roughened and containing a light diffusion material.

The resin materials composing the resin films (a) to (c) are not particularly limited, and the same resin material as that of the transparent protective layer 4 can be is applicable. Examples of the resin materials may include, for example, (meth)acrylic resins, polycarbonate resins, polyester resins, polyolefin resins, and polystyrene resins.

When the diffused light control sheet 10 is installed near a light source that emits heat, the light-diffusing layer 5 preferably has heat resistant, and from this viewpoint, the light-diffusing layer 5 is preferably formed of a polycarbonate resin When at least one surface of the resin film is roughened, the surface roughness Ra (centerline average roughness) is preferably 0.5 μm or more, more preferably 1.5 μm or more, and yet more preferably 2.5 μm or more.

When the surface roughness Ra of the resin film is more than or equal to the lower limit of the above range, the above haze value can be sufficiently ensured.

The upper limit of the surface roughness Ra of the resin film may be, but not particularly limited to, for example, 30 μm or less in consideration of the balance with the thickness of the resin film.

The surface roughness Ra is the centerline average roughness defined by JIS B 0601-2001, and is the value measured by a measuring instrument in accordance with the standard.

When both surfaces of the resin film are roughened, the surface roughness Ra of the roughened surfaces may be the same or different.

If both sides have a different surface roughness Ra, the absolute value of the difference between the surface roughness Ra on one side and the surface roughness Ra on the other side may be preferably, for example, 0.5 μm or more, more preferably 1.0 μm or more, and yet more preferably 1.5 μm or more. The absolute value of the difference between the surface roughness Ra of one side of the resin film and the surface roughness Ra of the other side of the resin film may be, but not particularly limited to, for example 29.5 μm or less in consideration of the balance with the thickness of the resin film.

Before using the resin film, an adhesive protection film may be attached to the outside of the resin film. In this case, considering the ease of peeling off the adhesive protection film at the time of use, a smaller surface roughness is preferable.

The type of surface roughening on the resin film is not limited, and any publicly known surface roughening performed on a resin film is applicable. Examples of surface roughening may include, for example, engraving, matting, sandblasting, and arranging minute irregularities made of light transmissive resin.

The light-diffusing material that may be included in the light-diffusing layer 5 may be any material that scatters at least part of the incident light, and examples of the light-diffusing material may include, for example, publicly known coloring agents that color the resin material, inorganic fine particles, and organic fine particles. The light-diffusing material may be one type or two or more types.

The color of the light-diffusing material is not particularly limited, and from the viewpoint of increasing light diffusion property and securing the above haze value, white is preferable for dyes, and white or colorless for fine particles.

As a concrete light-diffusing layer 5, publicly known light diffusers to be installed on LEDs may be exemplified. However, from the viewpoint of sufficiently securing the above haze value, a laminate of a transparent resin layer and a printing layer such as white printing on the outer surface (opposite side of the louver layer 1) of the transparent resin layer does not fall under the light-diffusing layer 5 of the present invention.

The thickness of the light-diffusing layer 5 can be, but not particularly limited to, for example, approximately 100 μm to 5000 μm.

The light-diffusing layer 5 may be a multilayer structure including two or more resin layers. For example, a structure in which one or more resin films selected from the aforementioned resin films (a) to (c) are laminated may be exemplified.

The resin films in the layers may be the same or different. The layers may be laminated with an intervening adhesive.

[Adhesive layer] The diffused light control sheet 10 may have an adhesive layer (not illustrated) between the louver layer 1 and the transparent protective layer 4 and/or between the louver layer 1 and the light-diffusing layer 5.

For example, publicly known adhesives that bond resin films together can be exemplified as the adhesive composing the adhesive layer. When the louver layer 1 is made of silicone rubber, it is preferable that the adhesive layer be made of silicone rubber in view of making the adhesion property to the louver layer 1, the reduction property for interfacial reflection between the louver layer 1 and the adhesive layer, the adhesive property to the transparent protective layer 4, and the transparency of the adhesive layer itself good.

The thickness of the adhesive layer is thinner than the bonding target, namely, the transparent protective layer 4 or light-diffusing layer 5, and is, for example, preferably approximately 0.1 μm to 50 μm, and more preferably 5 μm to 30 μm.

If the diffused light control sheet 10 does not have the adhesive layer, the louver layer 1 and the transparent protective layer 4, and the louver layer 1 and the light-diffusing layer 5 can be directly bonded by other publicly known methods such as thermal bonding.

Second Embodiment

The light-diffusing layer of the diffused light control sheet of this mode does not have to be the resin film described above.

Figure 3:
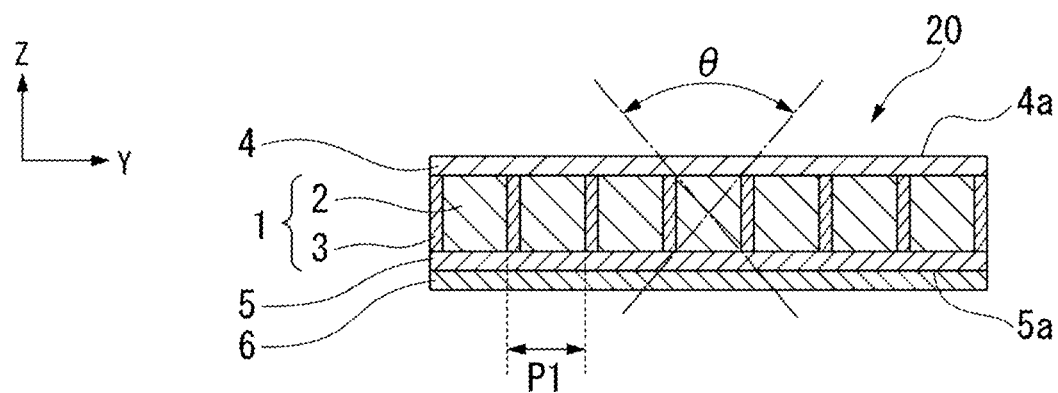
FIG. 3 is a cross-sectional view of another example of the diffused light control sheet according to the present invention.

FIG. 3 illustrates a diffused light control sheet 20 of a second embodiment. In the diffused light control sheet 20, the same components as in the first embodiment are marked with the same reference signs and their descriptions are omitted.

The light-diffusing layer 5 of the second embodiment is an adhesive layer that includes an adhesive bonding the second face of the louver layer 1 to a base layer 6 and a light diffusion material.

As the adhesive described above, a publicly known adhesive that bonds publicly known resin films together is applicable. As the light diffusion material, the light diffusion material of the diffused light control sheet 10 is similarly applicable.

The thickness of the light-diffusing layer 5 of the second embodiment is thinner than the base layer 6, and can be, for example, 20 μm to 200 μm.

Similar to that of the diffused light control sheet 10, the haze of the light-diffusing layer 5 of the second embodiment measured in accordance with JIS K 7136 (2000) is also 93% or more, preferably 94% or more, more preferably 95% or more, and yet more preferably 96% or more, but may be 100%. Here, the preferable light transmittance of the light-diffusing layer 5 is, for example, 10 to 90%.

The haze of the light-diffusing layer 5 of the second embodiment is a value calculated by subtracting the haze of the base layer 6 alone from the measurement obtained in a state where the light-diffusing layer 5 is laminated on the surface of the base layer 6. The following details the base layer 6.

[Base layer 6] As the material of the base layer 6, for example, a thermoplastic resin or a thermosetting resin with high transparency is used. Specific examples may include cellulosic resins, polyolefin resins, polyester resins, silicone resins, polystyrene resins, polyvinyl chloride resins, acrylic resins, and polycarbonate resins. Among these resins, polycarbonate is preferable in view of improving heat resistance, rigidity, and toughness.

The thickness of the base layer 6 can be, but not particularly limited to, for example, approximately 100 μm to 5000 μm.

Figure 4:
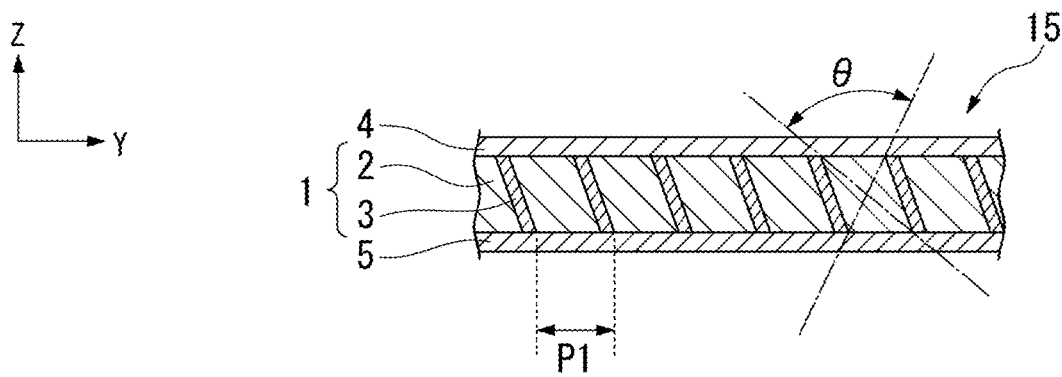
FIG. 4 is a cross-sectional view of another example of the diffused light control sheet according to the present invention.

In the cross-section in the thickness direction of the diffused light control sheets 10 and 20 described above, the angle between the surface of the louver layer 1 and each light-shielding zone 3 is 90 degrees, and the light-shielding zones 3 penetrate in a direction parallel to the thickness direction (Z direction) of the louver layer 1. The angle in the diffused light control sheet of the present invention is not limited to 90 degrees only, but can be set arbitrarily in the range of, for example, 20 to 120 degrees. FIG. 4 illustrates a cross-sectional view of a diffused light control sheet 15 in which the angle is 70 degrees.

The resin composing the diffused light control sheet of the present invention may contain additives publicly known in the resin film field, such as an ultra-violet absorber, an infrared absorber, and a coloring agent, for the purpose of improving weather resistance, improving design, or other purposes, as needed.

[Method of manufacturing diffused light control sheet] The louver layer 1 included in the diffused light control sheet of the present invention can be manufactured, for example, by the following method. First, a plurality of first sheets with a desired thickness made of the material constituting the light-transmitting zone 2 and a plurality of second sheets with a desired thickness made of the material constituting the light-shielding zone 3 are alternately laminated, heated, and pressurized to form a block body in which these sheets are integrated together.

The louver layer 1 is then obtained by slicing the block body along a cutting plane perpendicular to the sheet surface. The slicing thickness (slice width) corresponds to the thickness of the louver layer 1. The angle between the surface of the louver layer 1 and the light-shielding zone 3 can be adjusted by slicing the block body in a plane inclined to the sheet surface.

The method of laminating and integrating the louver layer 1, the transparent protective layer 4, and the light-diffusing layer 5 is not particularly limited, and publicly known methods of laminating resin layers can be used.

One example is to apply a silicone rubber adhesive to the first surface of the louver layer 1 and bond the transparent protective layer 4 prepared in advance. By the same method, a resin film forming the light-diffusing layer 5 can be bonded to the second surface of the louver layer 1.

By applying an adhesive composition containing a light diffusion material to the second surface of the louver layer 1, attaching the desired base layer 6 thereto, and then curing the adhesive composition, the light-diffusing layer 5, which is the adhesive layer bonding the second surface of the louver layer 1 and the base layer 6, can be formed.

By laminating the louver layer 1, the transparent protective layer 4, and the light-diffusing layer 5 and forming the integrated laminate into the desired shape, the diffused light control sheets 10 to 20 are obtained. The flat shapes of the diffused light control sheets 10 to 20 are not limited, and any shape, such as a rectangle, polygon, circle, and oval, can be adopted as appropriate according to the shape of the installation place.

<<Use of Diffused Light Control Sheet>>

Figure 5:
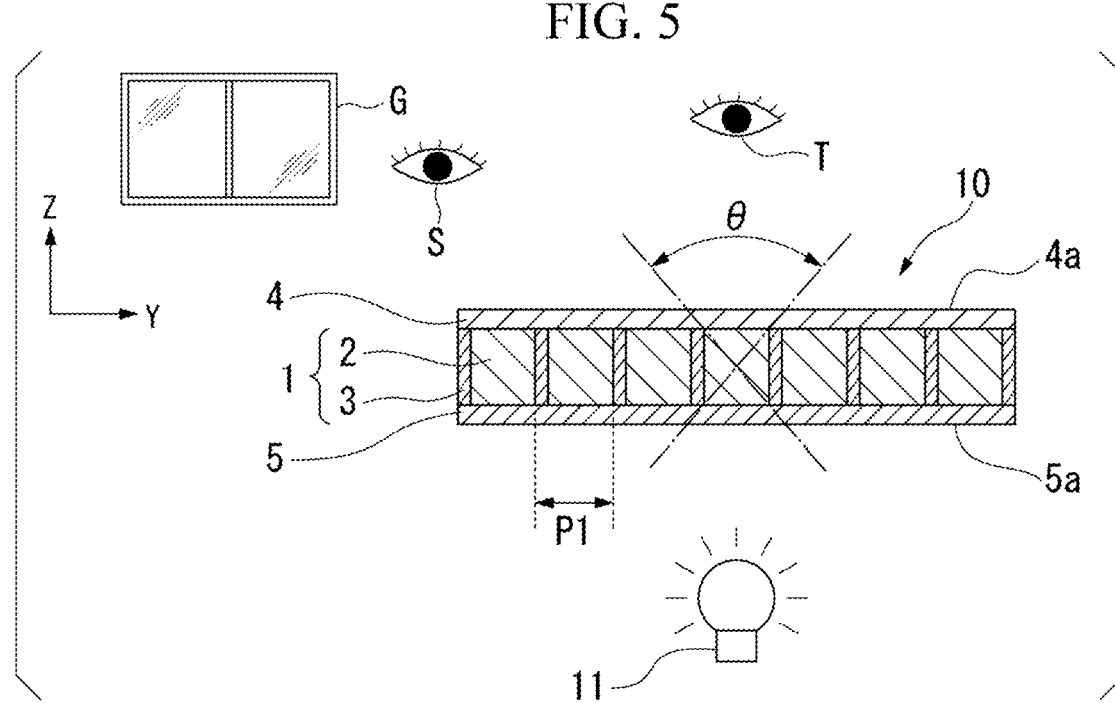
FIG. 5 is a cross-sectional view illustrating a use example of a diffused light irradiation device including the diffused light control sheet according to the present invention.

The diffused light control sheet is preferably placed between the light source and an object to be irradiated. For example, FIG. 5 illustrates a case where the diffused light control sheet 10 disposed between an LED light source 11 and an observer T. The light having a high rectilinear propagation property (rectilinear light) emitted from the LED light source 11 is incident on the light-diffusing layer 5 to be converted to diffused light, and the entire surface of the light-diffusing layer 5 emits the diffused light. Then, of the diffused light emitted from the light-diffusing layer 5, only the diffused light transmitted through the light-transmitting zones 2 of the louver layer 1 reaches the observer T to be visually recognized. By contrast, the diffused light does not reach an observer S and a window glass G that are present outside the viewing angle 9 of the louver layer 1 because the diffused light is blocked by the light-shielding zones 3 of the louver layer 1. If the louver layer 1 is not prepared, the diffused light emitted from the entire light-diffusing layer 5 reaches the observer S and the window glass G.

In the diffused light control sheet 10, the light-transmitting zones 2 and the light-shielding zones 3 penetrate in the thickness direction of the louver layer 1, and therefore the direction of diffused light transmitted through the louver layer 1 is aligned in the thickness direction of the louver layer 1. If the light-transmitting zones 2 and light-shielding zones 3 penetrate in a direction inclined with respect to the thickness direction of the louver layer 1, the direction of diffused light is similarly aligned in the inclined direction.

In the diffused light control sheet of the present invention, the transparent protective layer, louver layer, and light-diffusing layer are in close contact with each other and have no air layer between the layers, so they are not affected by refraction or scattering by the air layer, and the interface reflection is reduced, resulting in excellent light transmittance.

<<Diffused Light Irradiation Device>>

A second mode of the present invention is a diffused light irradiation device including the diffused light control sheet of the first mode, and a light source installed on the second face side of the louver layer of the diffused light control sheet.

Figure 6:
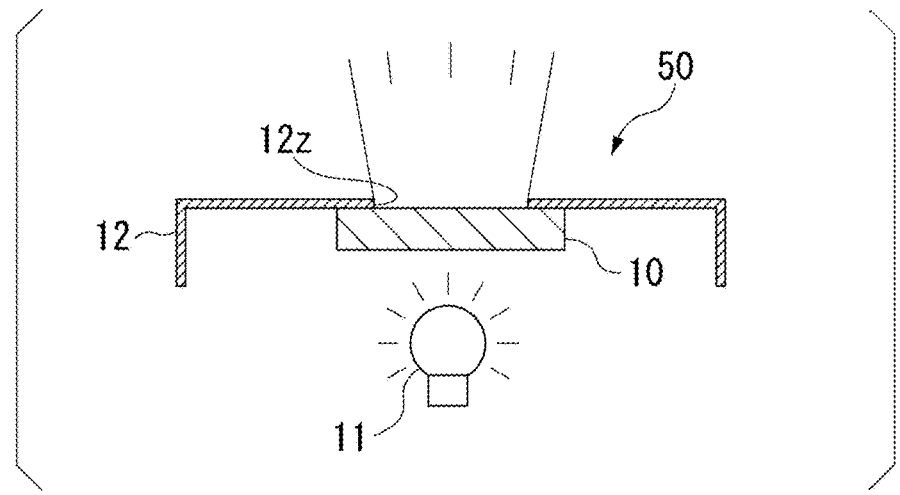
FIG. 6 is a cross-sectional view illustrating another use example of a diffused light irradiation device including the diffused light control sheet according to the present invention.

A diffused light irradiation device 50 illustrated in FIG. 6 has the light source 11 such as LED, an enclosure 12 with the light source 11 inside, and the diffused light control sheet 10. On the outer surface of the enclosure 12, a small window penetrating a wall of the enclosure 12 is formed, and the diffused light control sheet 10 covers, from the inside, an opening 12z of the small window. The transparent protective layer 4 of the diffused light control sheet 10 is arranged toward the outside of the enclosure 12, and the light-diffusing layer 5 is arranged toward the inside of the enclosure 12 (a side on the light source 11).

In the diffused light irradiation device 50 in FIG. 6, light emitted from the light source 11 is converted into diffused light by the light-diffusing layer 5 of the diffused light control sheet 10. After the diffused light is emitted in a plane shape, the irradiation direction is controlled by the louver layer 1. With this configuration, the diffused light can be emitted from the entire light-diffusing layer 5 covering the opening 12z only to the area within the viewing angle of the louver layer 1. Conversely, when the opening 12z is viewed from the outside within the viewing angle of the louver layer 1, the entire contour of the opening 12z can be visibly recognized. When the contour of the opening 12z is being that of an indicator with a desired shape, the flickering of the entire indicator can be controlled by the flickering of the light source 11.

Figure 7:
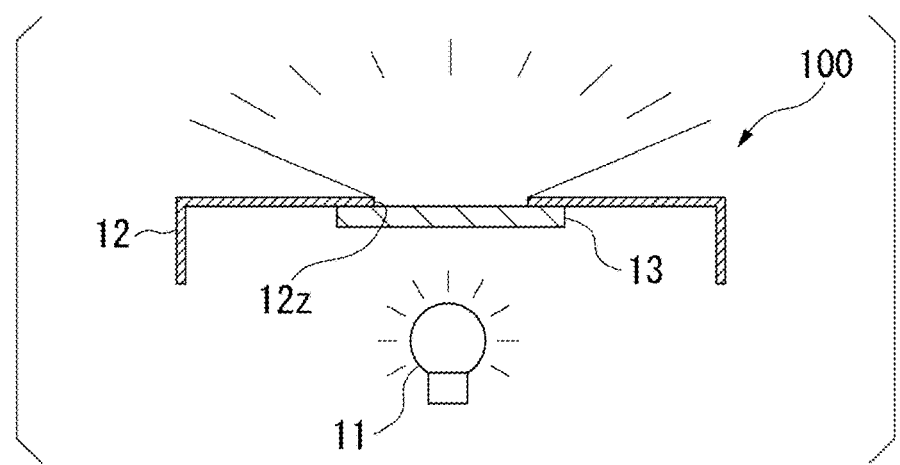
FIG. 7 is a cross-sectional view of a diffused light irradiation device in a comparative example.

Incidentally, a diffused light irradiation device 100 illustrated in FIG. 7 has the same configuration as that of the diffused light irradiation device 50 in FIG. 6, except that the diffused light irradiation device 100 includes a light diffuser 13, which corresponds to the light-diffusing layer 5, instead of the diffused light control sheet 10.

In the diffused light irradiation device 100 in FIG. 7, light emitted from the light source 11 is converted into diffused light by the light diffuser 13. The diffused light is emitted in almost all directions from the entire light diffuser 13 covering the opening 12z. Therefore, it is not possible to irradiate only the area of a desired viewing angle with the diffused light.

Figure 8:
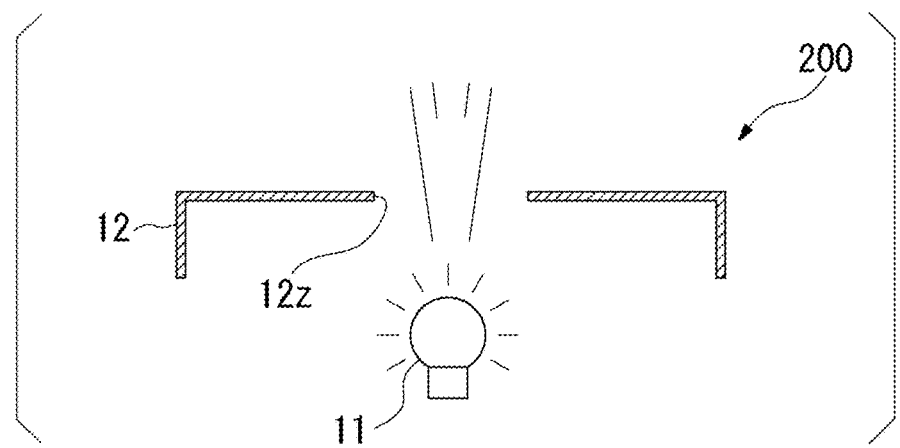
FIG. 8 is a cross-sectional view of the configuration of the light irradiation device in a comparative example.

A light irradiation device 200 illustrated in FIG. 8 has a configuration in which the light diffuser 13 is removed from the diffused light irradiation device 100 in FIG. 7.

In the light irradiation device 200 in FIG. 8, light emitted from the light source 11 is emitted outward from a limited area of the opening 12z. When the light source 11 is a light source that emits light having a high rectilinear propagation property, such as an LED, the light source 11 emits rectilinear light only to a limited area. In other words, the viewing angle is too narrow to be visually recognized, and even if the emitted light could be visually recognized, it is difficult to visually recognize the contour of the opening 12z. Therefore, it is difficult to use the contour of the opening 12z as an indicator. In addition, it is difficult to give the light source 11 a function as an indicator because the luminance of the light source 11 needs to be reduced because looking directly at light having a high rectilinear propagation property may damage the eyes.

EXAMPLE

Each example below is an example of the present invention, and the present invention may include examples not exemplified below.

[Example 1] The diffused light control sheet 10 illustrated in FIGS. 1 and 2 was manufactured.

First, as the material of the light-transmitting zones 2, a first sheet having a thickness of 125 μm and made of transparent silicone rubber (manufactured by Shin-Etsu Chemical Co., Ltd., trade name: KE-153-U) was prepared.

Separately, as the material of the light-shielding zones 3, a second sheet having a thickness of 10 μm and made of a material obtained by adding 15 parts by mass of carbon black to 100 parts by mass of transparent silicone rubber (manufactured by Shin-Etsu Chemical Co., Ltd., trade name: KE-153-U) was prepared.

A plurality of the first sheets and a plurality of the second sheets were alternately laminated, heated, vulcanized, and pressurized to form a block body in which these sheets are integrated.

The louver layer 1 was created by slicing the block body with a thickness of 310 μm along a cutting plane perpendicular to the sheet surface.

Next, a film obtained by laminating an acrylic resin layer with a thickness of 75 μm and a polycarbonate layer with a thickness of 925 μm was prepared as the transparent protective layer 4. On a surface of this film on the polycarbonate layer side, liquid silicone rubber (manufactured by Shin-Etsu Chemical Co., Ltd., trade name: KE-1987) was applied with a thickness of approximately 20 μm using a screen printer, and the applied surface was placed on the first surface of the louver layer 1 to be heat vulcanized and bonded.

Using the same method, a light-diffusing layer 5 including a polycarbonate film with a thickness of 200 μm (both surfaces have been roughened, the centerline average roughness on one side Ra=3.0 μm, and the centerline roughness on the other side Ra=0.9 μm) was bonded to the second face of the louver layer 1 to obtain the diffused light control sheet 10.

The haze of the above light-diffusing layer 5 measured with a haze meter in accordance with JIS K 7136 (2000) was 94%.

The viewing angle of the diffused light control sheet 10 was approximately 650 in a plane perpendicular to the longitudinal direction in which the light-transmitting zones 2 and the light-shielding zones 3 of the louver layer 1 extend (Y-Z plane in FIG. 2).

An LED device caused to light up was put close to the light-diffusing layer 5 of the created diffused light control sheet 10 and viewed from a side on the transparent protective layer 4, the shape and position of the LED device were not seen through the light-diffusing layer 5, and the light-diffusing layer 5 functioned as a surface light source. The viewing angle control by the louver layer 1 was also sufficient, the diffused light from the light-diffusing layer 5 being barely visible when viewed from an angle off the front.

[Example 2] A diffused light control sheet was created in the same way as in Example 1, except that a roughened white pigmented polycarbonate film (the centerline average roughness on one side Ra=2.5 μm, and the centerline roughness on the other side Ra=0.5 μm) was used instead of the roughened transparent polycarbonate film used in Example 1. Similar to Example 1, observation was made from various angles with the LED device put closer to the created diffused light control sheet, and it was confirmed that the function was the same as in Example 1. The haze of the above light-diffusing layer 5 measured with a haze meter in accordance with JIS K 7136 (2000) was 99%.

REFERENCE SIGNS LIST

1: louver layer, 2: light-transmitting zone, 3: light-shielding zone, 4: transparent protective layer, 4a: surface of transparent protective layer, 5: light-diffusing layer, 5a: outer surface of light-diffusing layer, 6: base layer, 10: diffused light control sheet, 15: diffused light control sheet, 20: diffused light control sheet, G: window glass, S: observer, T: observer, 11: light source, 12: enclosure, 12z: opening, 13: light diffuser, 50: diffused light irradiation device, 100: diffused light irradiation device, 200: light irradiation device

The invention claimed is:

1. A diffused light irradiation device, comprising
a diffused light control sheet;
an enclosure; and
a light source inside the enclosure, wherein
the diffused light control sheet comprises:
- a louver layer on which light-transmitting zones and light-shielding zones are arranged alternately, wherein the light-shielding zones contain black pigment, and the light-transmitting zones and the light-shielding zones are formed of silicone rubber;
- a transparent protective layer disposed on a first face of the louver layer; and
- a light-diffusing layer disposed on a second face of the louver layer, wherein the light-diffusing layer is a resin film bonded to the second face of the louver layer, at least one surface of the resin film is roughened, or the resin film contains a light-diffusing material,
the light-diffusing layer has a haze of 93% or more as measured in accordance with JIS K 7136 (2000),
the light source is installed on a side of the second face of the louver layer of the diffused light control sheet, on an outer surface of the enclosure, a window penetrating a wall of the enclosure is formed, and the diffused light control sheet covers, from the inside of the enclosure, an opening of the window,
the transparent protective layer of the diffused light control sheet is arranged toward an outside of the enclosure, and the light-diffusing layer is arranged toward the inside of the enclosure, and
the light source is an LED.

2. The diffused light irradiation device according to claim 1, wherein each of the transparent protective layer and the resin film is independently a polycarbonate film.

3. The diffused light irradiating device according to claim 1, wherein the light-diffusing layer has a multilayer structure formed by two or more resin layers.

4. The diffused light irradiation device according to claim 1, wherein
the transparent protective layer has a multilayer structure formed by two or more resin layers,
a first resin layer in the multilayer structure that defines a front surface opposite to the louver layer is formed of a (meth)acrylic resin, and
a second resin layer in the multilayer structure that defines a back surface on a side of the louver layer is formed of a polycarbonate.

* * * * *